Patented Nov. 10, 1942

2,301,861

UNITED STATES PATENT OFFICE 2,301,861

KETONE-AMINE COMPOUNDS

Frederick B. Downing and Charles J. Pedersen, Penns Grove, N. J., assignors to E. I. du Pont de Nemours & Company, Wilmington, Del., a corporation of Delaware No Drawing. Application November 10, 1939, Serial No. 303,782

22 Claims. (Cl. 260—566)

This invention relates to new ketone-amines, and particularly to the condensation products of certain ketones with certain amines which are particularly effective for the preservation of oxidizable organic substances containing or in contact with copper and its compounds.

Oxidation reactions, which are initiated or modified by the presence of a catalyst, may be conveniently divided into two classes:

(1) Those caused by molecular oxygen, and
(2) Those caused by oxidizing agents.

Reactions of the first class occur continuously and spontaneously because oxygen is ubiquitous. In the following discussion, the term "oxidation" refers only to those reactions involving molecular oxygen including, however the intermediate compounds formed which are capable of effecting further oxidation.

Copper and its salts accelerate the oxidation of many organic substances, including most of the antioxidants. It is well known that copper promotes the formation of gum in gasoline, and speeds up the aging of rubber and the development of rancidity in fats and oils. Hence, copper and antioxidants are antagonistic in action, and the normal inhibiting effect of the latter is greatly reduced in the presence of the former.

Copper occurs naturally in many organic products, but usually in such slight traces as to cause very little harm. The concentration of copper, however, is frequently raised during the course of handling and utilizing the products: vessels and conduits made of metals containing copper are used for storage and transportation; ingredients contaminated with copper might be added; copper might actually be required in one of the steps in the process for manufacture as in the copper sweetening of gasoline.

Compounds capable of effectively suppressing the catalytic activity of copper and its salts have been found and have been named copper deactivators. While the so-called "antioxidants" are specific to the type of organic substance, it has been found that copper deactivators are specific for copper and its compounds and are independent of the organic substance.

An object of the present invention is to provide new compounds which are effective for retarding the deterioration of organic substances caused by the action of molecular oxygen and promoted by the presence of copper and its compounds. Another object is to provide a class of new organic compounds which, when added to an organic substance normally subject to deterioration by oxygen in the presence of copper and its compounds, will suppress the activity of the copper or its compounds. A further object is to provide a class of new ketone-amine condensation products. Other objects are to advance the art. Still other objects will appear hereinafter.

The above and other objects may be accomplished in accordance with our invention which comprises providing new ketone-amines of the type of a di-(2-hydroxy aromatic ketone) aliphatic polyamine having a molecular weight of at least 310 in which the carbonyl carbon of each ketone group is doubly bonded to a different nitrogen atom which is in turn singly bonded to an aliphatic carbon atom of the aliphatic group. These compounds are obtained by condensing one mol of an aliphatic polyamine, containing two primary amino groups, with two mols of a 2-hydroxy substituted aromatic ketone, so that one and only one mol of ketone reacts for each primary amino group of the amine.

The polyamine may be any aliphatic amine containing two primary amino groups directly attached to different aliphatic carbon atoms of the same open chain and which amine may contain aromatic, heterocyclic, alkoxy, aryloxy, halogen, hydroxyl, secondary amino or tertiary amino groups substituted on the chain, but, preferably, should be free of strongly acidic groups such as sulfonic and sulfuric acid groups. The term "aliphatic polyamine", as employed hereinafter and in the claims, will be understood to have the foregoing meaning. The preferred polyamines are the alkylene diamines, consisting of carbon, hydrogen and nitrogen and particularly those in which the primary amino groups are directly attached to adjacent carbon atoms, such as ethylenediamine, 1,2-propylenediamine and 3,4-diaminohexane.

By "adjacent atoms," we mean atoms directly bonded together. By the term "alkylene diamine," we mean compounds which, except for the amino nitrogens, consist of saturated aliphatic hydrocarbons containing no aromatic rings.

By a "2-hydroxy aromatic ketone," we mean one in which the hydroxy group and the keto, or

group are directly bonded to adjacent ring carbon atoms. By the term "2-hydroxy aryl ketone," we intend to include only those ketones which, except for the OH and

groups, consist of carbon and hydrogen. By the term "a di-(2-hydroxy phenone," we mean those of the benzene series containing only one benzene ring.

The ketone is preferably an aromatic ketone and also preferably a 2-hydroxy aryl ketone. Of these, the mixed alkyl-(2-hydroxy-aryl-ketones), in which the alkyl group contains up to 6 carbon atoms, are the most desirable. By the terms "mixed aliphatic-aromatic ketone" and "mixed alkyl-aryl ketone," we mean those in which one valence of the

group is satisfied by an aliphatic or alkyl group and the other valence is satisfied by a ring carbon atom of a benzene ring in an aromatic or aryl group, as the case may be. However, the ketones may contain, as substituents, alkoxy, aryloxy, halogen, heterocyclic, amino, cyano and nitro groups, as well as hydroxy, alkyl and aryl radicals, but, preferably, should be free of strongly acidic groups such as sulfonic and sulfuric acid groups.

Amongst the compounds which we have found to be particularly desirable are

Di-(2-hydroxy acetophenone)-
    1,2-propylene diamine

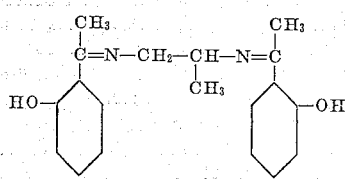

Di-(2-hydroxy-5-methyl-aceto-
    phenone) ethylenediamine

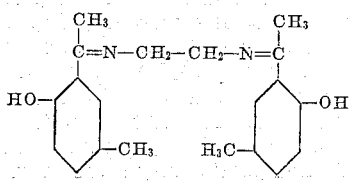

Di-(2-hydroxy-4-methyl-aceto-
    phenone) ethylenediamine

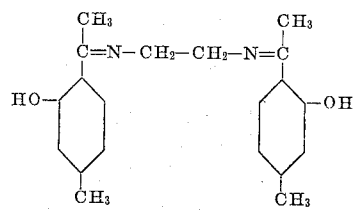

Di-(2-hydroxy-propiophenone) ethylenediamine.

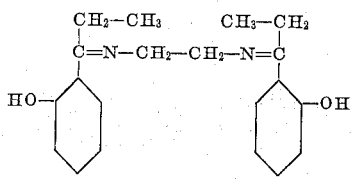

Di-(2-hydroxy-5-methyl-aceto-
    phenone) 1,2-propylenediamine

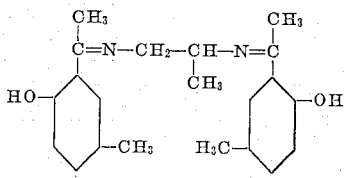

Di-(2-hydroxy-propiophenone)-
    1,2-propylenediamine

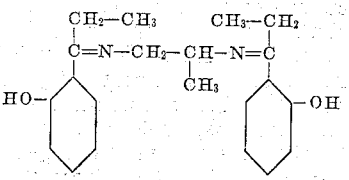

Di-(2-hydroxy-5-methyl-aceto-
    phenone) 3,4-diaminohexane

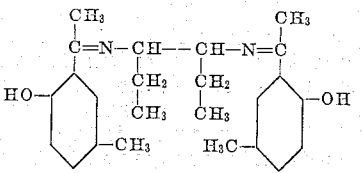

Di-(2-hydroxy-5-methyl-aceto-
    phenone) triethylenetetramine

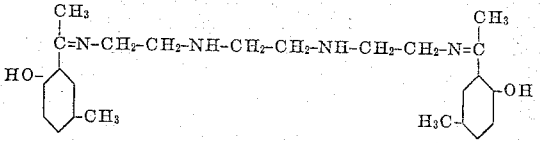

Di-(2-hydroxy-5-methyl-aceto-
    phenone) 1,3-diaminopropanol-2

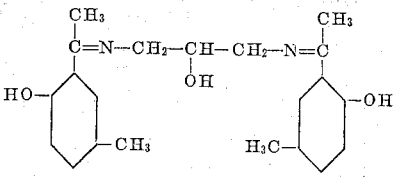

Di-(2-hydroxy-5-methyl-acetophenone) 1,3-
    diamino-2-methylpropanol-2

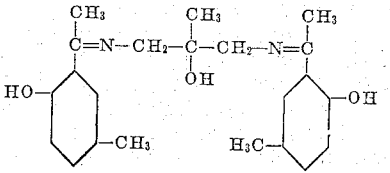

The term "stabilized gasoline" is employed to denote gasoline to which has been added an antioxidant in sufficient quantity to significantly increase its induction period in the absence of added copper.

The following table illustrates the physical properties of some of our compounds, in which "Thry" means "theory," "Fnd" means "found," "Uncorr." means "uncorrected," and "Phys." means "physical."

TABLE I

*The effect of copper deactivators*

These data were obtained in a gasoline having the following properties:

|  | Minutes induction period |
|---|---|
| Control (unstabilized) | 210 |
| Plus 0.001% BAP | 330 |
| Plus 0.001% BAP+1 p. p. m. Cu | 30 |

| No. | Condensation products of— | Percent nitrogen Thry | Percent nitrogen Fnd | M.P.°C. Uncorr. | Phys. form |
|---|---|---|---|---|---|
|  | 2 moles 2-hydroxy-5-methylacetophenone with: |  |  |  |  |
| 1 | 1 mole ethylenediamine | 8.64 | 8.56 | 204-6 | Yellow crystals. |
| 2 | 1 mole 1,2-propylenediamine | 8.28 | 8.23 | 155 | Do. |
| 3 | 1 mole 1,3-propylenediamine | 8.28 | 8.25 | 114 | Do. |
| 4[1] | 1 mole 3,4-diaminohexane | 7.37 | 5.26 |  | Yellow oil. |
| 5 | 1 mole hexamethylenediamine | 7.37 | 7.32 | 160 | Yellow crystals. |
| 6 | 1 mole decamethylenediamine | 6.42 | 6.51 | 118.6 | Do. |
| 7 | 1 mole diethylenetriamine | 11.44 | 11.45 | 104.5 | Do. |
| 8 | 1 mole 1,3-diaminopropanol-2 | 7.91 | 7.95 | 209.2 | Do. |
| 9 | 1 mole 1,3-diamino-2-methyl-propanol-2 | 7.61 | 7.65 | 138.6 | Do. |
| 10 | 1 mole di(b-aminoethyl) sulfide | 7.29 | 7.28 | 110 | Do. |
|  | 2 moles 2-hydroxy-4 and 5-methylacetophenone with: |  |  |  |  |
| 11[2] | 1 mole ethylenediamine | 8.64 | 8.59 |  | Do. |
|  | 2 moles of 2-hydroxypropiophenone with: |  |  |  |  |
| 12 | 1 mole ethylenediamine | 8.64 | 8.65 | 135.6 | Do. |
| 13 | 1 mole 1,2-propylenediamine | 8.28 | 7.61 |  | Yellow oil. |
| 14 | 1 mole decamethylenediamine | 6.42 | 6.24 |  | Do. |
|  | 2 moles 2,4-dihydroxyacetophenone with: |  |  |  |  |
| 15 | 1 mole ethylenediamine | 8.54 | 8.57 | 325.5d | Light yellow crystals. |

[1] The sample of 3,4-diaminohexane being contaminated, an impure condensation product was obtained.
[2] The ketone being a mixture of 2-hydroxy-4-methylacetophenone and 2-hydroxy-5-methylacetophenone, the condensation product was also a mixture which did not have a sharp melting point. It softened at 150° C. and melted between 192-200° C.

These compounds are soluble in alcohols such as methanol, ethanol and butanols; in ethers such as diethyl ether; in ketones such as acetone; in amines such as aniline and toluidines; in aromatic hydrocarbons such as benzene, toluene and xylenes; and to a lesser extent in aliphatic hydrocarbons such as petroleum ether and naphtha. They are particularly soluble in liquid phenolic compounds such as the mixed xylenols.

The method, used for determining the induction periods given below, was the accelerated method developed by Voorhees & Eisinger (S. A. E. J. 24 584, 1929). It consists in heating 100 cc. of gasoline at 100° C. in a 1 liter Pyrex flask containing pure oxygen. The internal pressure is observed every 10 minutes by means of a manometer attached to the system. The elapsed time from the start of the test until the gasoline begins to absorb oxygen at the rate of 10 cc. or higher per 10 minutes as shown by the fall in internal pressure, is taken as the induction period. It has been found that the induction period obtained by this method, although greatly shortened, is a fairly accurate measure of the relative stability of gasoline under normal storage conditions.

The deactivators were tested in this gasoline containing 0.001% BAP and 1 p. p. m. Cu.

| No. | Deactivator | Conc. Weight percent | Induction period Minutes |
|---|---|---|---|
| 1 | None |  | 30 |
| 2 | Di-(2-hydroxy-5-methyl-acetophenone) ethylenediamine | 0.002 | 330 |
| 3 | Di-(2-hydroxy-(mixed 4 and 5)-methyl-acetophenone) ethylenediamine | 0.002 | 330 |
| 4 | Di-(2-hydroxy-propiophenone) ethylenediamine | 0.002 | 330 |
| 5 | Di-(2-hydroxy-5-methyl-acetophenone) 1,2-propylenediamine | 0.002 | 290 |
| 6 | Di-(2-hydroxy-propiophenone)1,2-propylenediamine | 0.002 | 320 |
| 7 | Di-(2-hydroxy-5-methyl-acetophenone) 3,4-diaminohexane | 0.002 | 250 |
| 8 | Di-(2-hydroxy-5-methyl-acetophenone) 1,3-propylenediamine | 0.002 | 80 |
| 9 | Di-(2-hydroxy-5-methyl-acetophenone) hexamethylenediamine | 0.002 | 40 |
| 10 | Di-(2-hydroxy-5-methyl-acetophenone) decamethylenediamine | 0.002 | 40 |
| 11 | Di-(2-hydroxy-propiophenone)deca-methylenediamine | 0.01 | 80 |
| 12 | Di-(2-hydroxy-5-methyl-acetophenone) (b-aminoethyl) sulfide | 0.002 | 50 |

It will be noted that the most effective compounds are the condensation products of orthohydroxy aromatic ketones with aliphatic diamines having the amino groups on adjacent carbon atoms.

The compounds of this class are readily prepared by mixing the polyamine with the ketone in substantially molecular proportions at ordinary room temperature. Usually, a slight excess of the polyamine will be employed. The reaction takes place without a solvent. However, it is generally preferred to employ a solvent such as water or an organic solvent such as methyl and ethyl alcohols. Catalysts are unnecessary. While the reaction takes place readily at room temperature, it is frequently desirable to employ gentle heat to shorten the reaction period and to complete the reaction. The yields are practically quantitative and usually are above 90% of theory. The compounds are yellowish and many of them are relatively high melting. The reaction may be represented by the following equation showing the reaction between 2-hydroxy-5-methyl-acetophenone and ethylene diamine.

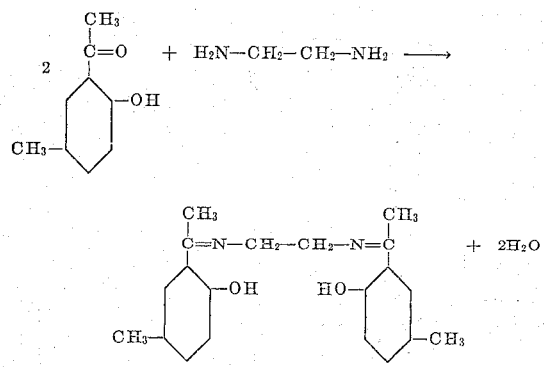

Unlike the usual antioxidants, these compounds are resistant to the action of molecular oxygen and solutions of the compounds may be kept in the presence of air for years without any apparent change. They are thermally stable but are destroyed by strong mineral acids.

Our compounds cannot be assigned to specific classes of organic products as can be done with the different types of antioxidants. So long as the organic substance does not have a high mineral acid content destructive to the deactivator, the deactivator, upon solution in the organic substance will be effective to suppress the catalytic activity of copper present and hence our compounds will be operative in different classes of oxidizable organic substances.

Mixtures of the compounds fall within our invention, as well as the condensation products of a given polyamine with a mixture of ketones, or a given ketone with a mixture of polyamines. Besides many others, the following compounds are within our invention:

Di- (2-hydroxy-5-methoxy-acetophenone) ethylenediamine
Di- (2-hydroxy-5-chloro-acetophenone) ethylenediamine
Di- (2-hydroxy-butyrophenone) ethylenediamine
Di- (2-hydroxy-benzophenone) ethylenediamine
Di- (2-hydroxy-5-methoxy-benzophenone) ethylenediamine
Di- (2-hydroxy-6-methyl-acetophenone) ethylenediamine
Di- (2-acetonaphthol-1) ethylenediamine
Di- (1-acetonaphthol-2) ethylenediamine Still other compounds within our invention may be prepared by condensing the following ketones with each of the following polyamines:

| Ketones | Polyamines |
|---|---|
| 2-hydroxy-acetophenone | 1,2-propylenediamine |
| 2-hydroxy-4-methyl-acetophenone | 2,3-butylenediamine |
|  | 3,4-diaminohexane |
| 2-hydroxy-5-methyl-acetophenone | 1,2-diphenyl-ethylenediamine |
|  | 2,3-diaminopentane |
| 2-hydroxy-5-methoxy-acetophenone | 1-phenyl-ethylenediamine |
|  | 3 - phenyl-1,2 -propylenediamine |
| 2-hydroxy-5-chloro-acetophenone | triethylenetetramine |
| 2-hydroxy-propiophenone | 1,3-propylenediamine |
| 2-hydroxy-butyrophenone | hexamethylenediamine |
| 2-hydroxy-benzophenone | decamethylenediamine |
| 2-hydroxy-5-methoxy-benzophenone | di-(b-amino-ethyl)sulfide |
|  | 1,3-diaminopropanol-2 |
| 2-hydroxy-6-methyl-acetophenone | 1,3 - diamino - 2 - methylpropanol-2 |
| 2-acetonaphthol-1 |  |
| 1-acetonaphthol-2 |  |

It is to be noted that not all condensation products of all ketones with organic polyamines are necessarily copper deactivators. Compounds, produced from ketones which do not contain a hydroxyl group attached to a carbon atom of the ring adjacent to the carbon to which the keto group is attached, have been found to have very little or no effect as copper deactivators.

While we have disclosed the preferred embodiments of our invention and the preferred modes of carrying the same into effect, it will be readily apparent that many variations and modifications may be made therein, particularly in the ketones and amines and the conditions for carrying out the reaction. Accordingly, our invention is not to be limited to the specific examples disclosed but only by the terms of the appended claims.

We claim:

1. A di-(o-hydroxy aromatic ketone) aliphatic polyamine compound of the Schiff's base type free of strongly acidic groups having a molecular weight of at least 310 in which the carbonyl carbon of each ketone group is doubly bonded to a different nitrogen atom which is in turn singly bonded to an aliphatic carbon atom of the aliphatic group, which is derived from an aliphatic polyamine containing only two primary amino groups.

2. A di-(o-hydroxy aromatic ketone) aliphatic diamine compound of the Schiff's base type free of strongly acidic groups having a molecular weight of at least 310 in which the carbonyl carbon of each ketone group is doubly bonded to a different nitrogen atom which is in turn singly bonded to an aliphatic carbon atom of the aliphatic group.

3. A di-(alkyl-o-hydroxy aromatic ketone) aliphatic polyamine compound of the Schiff's base type free of strongly acidic groups having a molecular weight of at least 310 in which the carbonyl carbon of each ketone group is doubly bonded to a different nitrogen atom which is in turn singly bonded to an aliphatic carbon atom of the aliphatic group, which is derived from an aliphatic polyamine containing only two primary amino groups.

4. A di-(alkyl-o-hydroxy aromatic ketone) aliphatic diamine compound of the Schiff's base type free of strongly acidic groups having a molecular weight of at least 310 in which the carbonyl carbon of each ketone group is doubly bonded to a different nitrogen atom which is in turn singly bonded to an aliphatic carbon atom of the aliphatic group.

5. A di-(alkyl-o-hydroxy aromatic ketone) alkylene polyamine compound of the Schiff's base type, free of strongly acidic groups, having a molecular weight of at least 310 and having the carbonyl carbon of each ketone group doubly bonded to a different nitrogen atom which is in turn singly bonded to an aliphatic carbon atom of the alkylene group, which is derived from an alkylene polyamine containing only two primary amino groups.

6. A di-(alkyl-o-hydroxy aromatic ketone) alkylene diamine compound of the Schiff's base type, free of strongly acidic groups, having a molecular weight of at least 310 and having the carbonyl carbon of each ketone group doubly bonded to a different nitrogen atom which is in turn singly bonded to an aliphatic carbon atom of the alkylene group.

7. A di-(alkyl-o-hydroxy aryl ketone) aliphatic polyamine compound of the Schiff's base type, free of strongly acidic groups, having a molecular weight of at least 310 and having the carbonyl carbon of each ketone group doubly bonded to a different nitrogen atom which is in turn singly bonded to an aliphatic carbon atom of the aliphatic group, which is derived from an aliphatic polyamine containing only two primary amino groups.

8. A di-(alkyl-o-hydroxy aryl ketone) aliphatic diamine compound of the Schiff's base type, free of strongly acidic groups, having a molecular weight of at least 310 and having the carbonyl carbon of each ketone group doubly bonded to a different nitrogen atom which is in turn singly bonded to an aliphatic carbon atom of the aliphatic group.

9. A di-(alkyl-o-hydroxy aryl ketone) alkylene diamine compound of the Schiff's base type having a molecular weight of at least 310 and having the carbonyl carbon of each ketone group doubly bonded to a different nitrogen atom of the alkylene diamine group.

10. A di-(alkyl-o-hydroxy phenone) alkylene diamine compound of the Schiff's base type, free of strongly acidic groups, having a molecular weight of at least 310 and having the carbonyl carbon of each phenone group doubly bonded to a different nitrogen atom of the alkylene diamine group.

11. A di-(alkyl-o-hydroxy aromatic ketone) aliphatic diamine compound of the Schiff's base type, free of strongly acidic groups, having a molecular weight of at least 310 and having the carbonyl carbon of each ketone group doubly bonded to a different nitrogen atom which nitrogen atoms are singly bonded to adjacent carbon atoms of the aliphatic group.

12. A di-(alkyl-o-hydroxy aromatic ketone) alkylene diamine compound of the Schiff's base type, free of strongly acidic groups, having a molecular weight of at least 310 and having the carbonyl carbon of each ketone group doubly bonded to a different nitrogen atom which nitrogen atoms are singly bonded to adjacent carbon atoms of the alkylene group.

13. A di-(alkyl-o-hydroxy aryl ketone) alkylene diamine compound of the Schiff's base type, free of strongly acidic groups, having a molecular weight of at least 310 and having the carbonyl carbon of each ketone group doubly bonded to a different nitrogen atom which nitrogen atoms are singly bonded to adjacent carbon atoms of the alkylene group.

14. A di-(alkyl-o-hydroxy phenone) aliphatic diamine compound of the Schiff's base type free of strongly acidic groups having a molecular weight of at least 310 in which the carbonyl carbon of each phenone group is doubly bonded to a different nitrogen atom which nitrogen atoms are singly bonded to adjacent carbon atoms of the aliphatic group.

15. A di-(alkyl-o-hydroxy phenone) alkylene diamine compound of the Schiff's base type having a molecular weight of at least 310 in which the carbonyl carbon of each phenone group is doubly bonded to a different nitrogen atom which nitrogen atoms are singly bonded to adjacent carbon atoms of the alkylene group.

16. A di-(o-hydroxy acetophenone) alkylene diamine compound of the Schiff's base type having a molecular weight of at least 310 in which the carbonyl carbon of each acetophenone group is doubly bonded to a different nitrogen atom which nitrogen atoms are singly bonded to adjacent carbon atoms of the alkylene group.

17. A di-(alkyl-o-hydroxy phenone) ethylene diamine compound of the Schiff's base type having a molecular weight of at least 310 in which the carbonyl carbon of each phenone group is doubly bonded to a different nitrogen atom of the ethylene diamine group.

18. A di-(o-hydroxy-alkyl-acetophenone) ethylene diamine compound of the Schiff's base type having a molecular weight of at least 310 in which the carbonyl carbon of each acetophenone group is doubly bonded to a different nitrogen atom of the ethylene diamine group.

19. Di-(2 - hydroxy - 5 - methyl-acetophenone) ethylene diamine.

20. The method of preparing a di-(o-hydroxy aromatic ketone) aliphatic polyamine compound of the Schiff's base type which comprises condensing 1 mol of an aliphatic polyamine in which only two amino groups are primary amino groups singly bonded to different aliphatic carbon atoms with 2 mols of a 2-hydroxy substituted aromatic ketone in an inert solvent and at approximately room temperatures so that one and only one mol of ketone reacts for each amino group of the amine, both the polyamine and the ketone being devoid of strongly acidic groups.

21. Di-(2-hydroxy acetophenone) 1,2-propylene diamine.

22. Di-(2 - hydroxy - 4 - methyl-acetophenone) ethylene diamine.

FREDERICK B. DOWNING.
CHARLES J. PEDERSEN.